US006702240B1

(12) United States Patent
Bradley

(10) Patent No.: US 6,702,240 B1
(45) Date of Patent: Mar. 9, 2004

(54) SAW CADDY

(76) Inventor: Carl E. Bradley, 13330 Roy Miller Rd., Grand Bay, AL (US) 36541

( * ) Notice: Subject to any disclaimer, the term of this patent is extended or adjusted under 35 U.S.C. 154(b) by 0 days.

(21) Appl. No.: 10/371,636

(22) Filed: Feb. 20, 2003

(51) Int. Cl.⁷ .................................................. A47F 5/00
(52) U.S. Cl. ..................... 248/301; 248/176.1; 248/300
(58) Field of Search ................................ 248/300, 301, 248/200.21, 176.1; 211/70.6, 60 T

(56) References Cited

U.S. PATENT DOCUMENTS

| | | | | | |
|---|---|---|---|---|---|
| 1,626,539 | A | * | 4/1927 | Jones ..................... | 248/297.11 |
| 3,360,075 | A | * | 12/1967 | Gutner ..................... | 182/106 |
| 4,036,463 | A | * | 7/1977 | Hopkins et al. ............ | 248/210 |
| 4,365,720 | A | * | 12/1982 | Kaneshiro .................. | 211/70.6 |
| 5,205,422 | A | * | 4/1993 | Morris ...................... | 211/70.6 |
| D344,347 | S | * | 2/1994 | Wittman ..................... | D25/67 |
| 5,833,185 | A | * | 11/1998 | Bradley .................. | 248/220.21 |
| 6,065,728 | A | * | 5/2000 | Spradlin ................... | 248/309.1 |
| 6,206,212 | B1 | * | 3/2001 | Loew .......................... | 211/189 |

\* cited by examiner

Primary Examiner—Ramon O. Ramirez
Assistant Examiner—Amy J. Sterling
(74) Attorney, Agent, or Firm—Hovey Williams LLP

(57) ABSTRACT

A saw caddy (10) for conveniently holding a saw (14) within easy reach of a user broadly comprises a mounting segment (32) to secure the saw caddy (10) to a leg (18) of a workstation (12), a offsetting segment (34) to offset the saw (14) from the workstation leg (18), and a retaining segment (36) to retain the saw (14) on the saw caddy (10). A bottom edge (44) of the mounting segment (32) abuts a top edge (54) of the offsetting segment (34) at a first angle (60) of approximately twenty-five degrees. A bottom edge (58) of the offsetting segment (34) abuts a bottom edge (66) of the retaining segment (34) at a second angle (70) of approximately forty-five degrees and forms a vertex (72) which is offset approximately one half inch from a plane (74) of the mounting segment (32).

20 Claims, 2 Drawing Sheets

SAW CADDY

BACKGROUND OF THE INVENTION

1. Field of the Invention

The present invention relates to saw caddies. More particularly, the present invention relates to a saw caddy for holding a saw within easy reach.

2. Description of the Prior Art

Circular saws are widely used by carpenters and other craftsmen to cut boards or other work pieces. Additionally, carpenters typically use saw horses or workbenches to support boards at an ergonomic height to facilitate cutting of the boards.

When a carpenter wishes to reposition a board or retrieve another board, he or she must typically rest his or her saw on the ground. Placing a saw on or retrieving a saw from the ground requires a carpenter to bend over placing stress on his or her back. Such back stress commonly results in back injury. A saw lying on the ground may also pose a tripping hazard, especially at busy construction sites. Additionally, saws lying on the ground may become contaminated with dirt or sand, which may damage components such as motors. Furthermore, exposed spinning blades present extreme safety hazards, if saw are laid on the ground.

In response, saw caddies have been developed to hold saws in more convenient positions without requiring carpenters to bend over. However, current saw caddies are typically designed to mate with a particular saw and thus may not work with a wide variety of saws or other tools. Additionally, carpenters are typically required to precisely guide their saws onto or into current saw caddies, which can distract them from other work. Furthermore, current saw caddies are typically expensive, complex to install, and may require removal, in order to fold collapsible saw horses.

Accordingly, there is a need for an improved saw caddy that overcomes the limitations of the prior art.

SUMMARY OF THE INVENTION

The present invention overcomes the above-identified problems and provides a distinct advance in the art of saw caddies. More particularly, the present invention provides a saw caddy for conveniently holding a saw within easy reach of a user. The saw caddy is preferably secured to a leg of a workstation. In this manner, the saw caddy may support the saw in close proximity to and slightly below a work surface of the workstation. This permits a user of the saw caddy to seat the saw upon and retrieve the saw from the saw caddy without having to bend over. Use of the saw caddy therefore eliminates back injury and stress associated with bending over to rest the saw on and retrieve the saw from the ground.

The saw caddy is designed for use with a saw having a blade, an upper blade guard (UBG), and a saw table that extends beyond the blade and the saw UBG. The saw caddy is preferably formed of a single piece of metal and broadly comprises a mounting segment to secure the saw caddy to the workstation leg, an offsetting segment to offset the saw from the workstation leg, and a retaining segment to retain the saw UBG of the saw on the saw caddy. The mounting segment preferably includes two mounting holes designed to accept a fastener to secure the saw caddy to the workstation leg.

A bottom edge of the mounting segment abuts a top edge of the offsetting segment such that the mounting segment meets the offsetting segment at a first angle of approximately twenty-five degrees. A bottom edge of the offsetting segment abuts a bottom edge of the retaining segment such that the offsetting segment meets the retaining segment at a second angle of approximately forty-five degrees. The second angle forms a vertex which is offset approximately one half inch from a plane of the mounting segment.

The vertex's offset allows the saw UBG to seat within the vertex while the blade of the saw is held substantially vertical, which is a normal operating orientation for the saw. Without the vertex's offset, due to the saw table, the saw would need to be tilted in order for the saw UBG to seat within the vertex. Thus, the vertex's offset allows the user to seat the saw upon the saw caddy and retrieve the saw from the saw caddy in the normal orientation and without having to tilt the saw.

The first and second angles cause the offsetting and retaining segments to guide the saw UBG into position within the vertex. For example, the user may slide the saw UBG downward along the mounting segment. In this case, due to the first angle, the offsetting segment will guide the saw UBG outward toward the vertex. Alternatively, the user may slide the saw UBG downward spaced from the mounting segment. In this case, due to the first and second angles, the retaining segment will guide the saw UBG inward toward the vertex. Thus, the user is not required to guide the saw onto the saw caddy, since the offsetting segment and the retaining segment ensure that the saw UBG is properly seated within the vertex. Additionally, arcuate corners of the retaining segment guide the saw into place by laterally centering the saw UBG within the vertex.

As a result, the user is not required to look at the saw caddy or the saw while seating the saw upon or retrieving the saw from the saw caddy. In fact, the user is only required to have a general knowledge of the saw caddy's location. The saw caddy is preferably colored red or another bright color in order to aid the user in quickly spotting the saw caddy.

It should be obvious that the saw caddy of the present invention conveniently holds the saw within easy reach of the user, while protecting the saw and the user from hazards normally presented by laying the saw on the ground.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
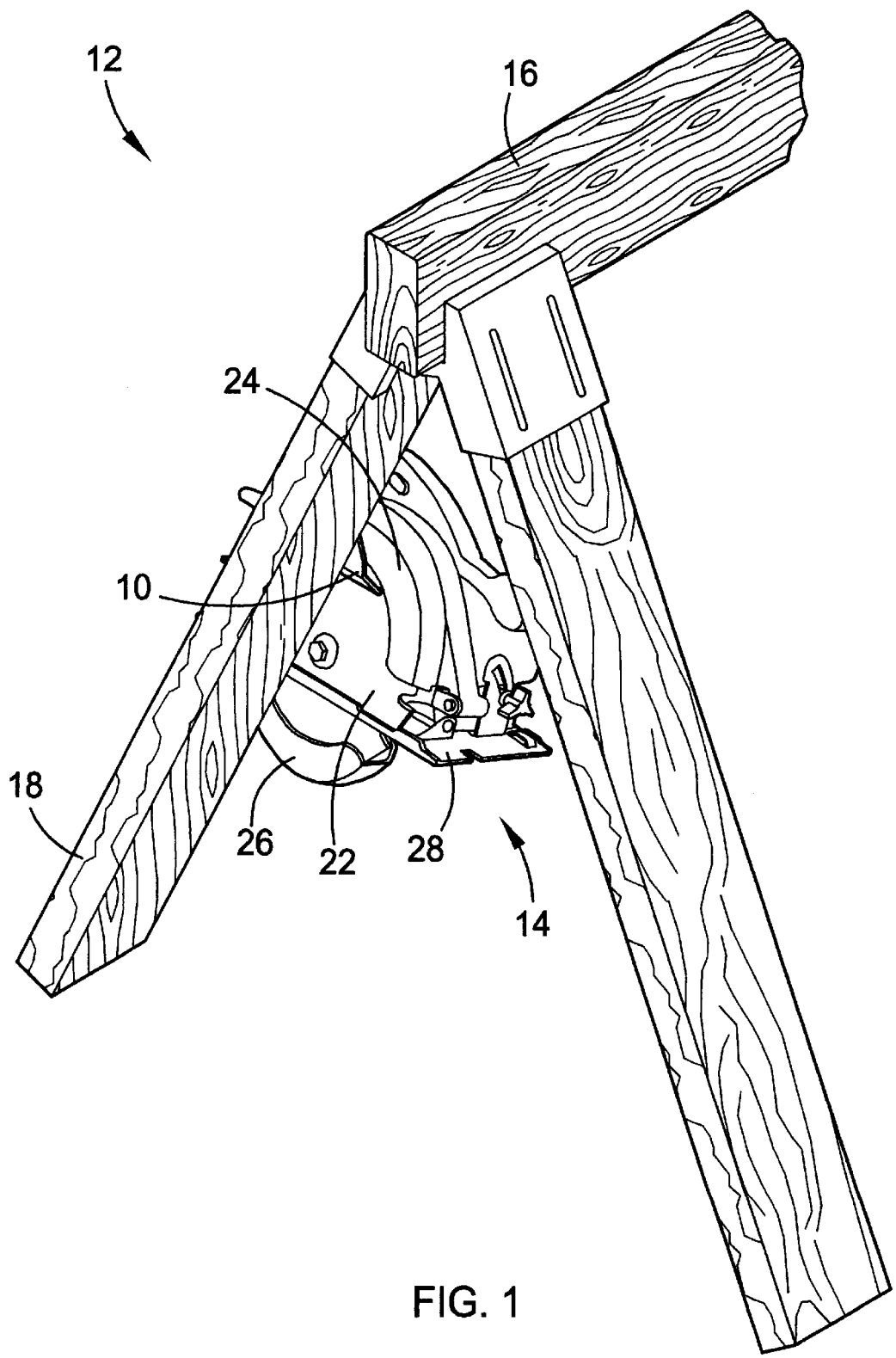
FIG. 1 is a perspective view of a saw caddy constructed in accordance with a preferred embodiment of the present invention, showing the saw caddy mounted to a workstation and supporting a circular saw.

Referring to FIG. 1, a saw caddy 10 constructed in accordance with a preferred embodiment of the present invention is illustrated mounted to a workstation 12 and supporting a saw 14. The workstation 12 may be a saw horse, a workbench, or any other conventional workpiece support. In either case, the workstation 12 preferably comprises a work surface 16 and four legs 18 to firmly support the work surface 16. The work surface 16 preferably supports a workpiece or board to be cut with the saw 14 at an ergonomic height of between thirty and fifty inches above the ground.

The saw 14 is preferably a conventional circular saw with a circular blade 22 and a fixed arcuate concave upper blade guard (UBG) 24. The saw 14 may or may not include a retractable lower blade guard 26. Additionally, the saw 14 may include a saw table 28 that extends beyond the blade 22 and guards 24,26.

The saw caddy 10 is preferably mounted to one of the workstation legs 18 slightly below the work surface 16 and workpiece. For example, the saw caddy 10 may be mounted to the workstation leg 18 between six inches and twelve inches below the work surface 16. In this manner, the saw caddy 10 may support the saw 14 in close proximity to and below the work surface 16. This permits a user of the saw caddy 10 to seat the saw 14 upon and retrieve the saw 14 from the saw caddy 10 without having to bend over. Use of the saw caddy 10 therefore eliminates back injury and stress associated with bending over to rest the saw 14 on and retrieve the saw 14 from the ground.

Figure 3:
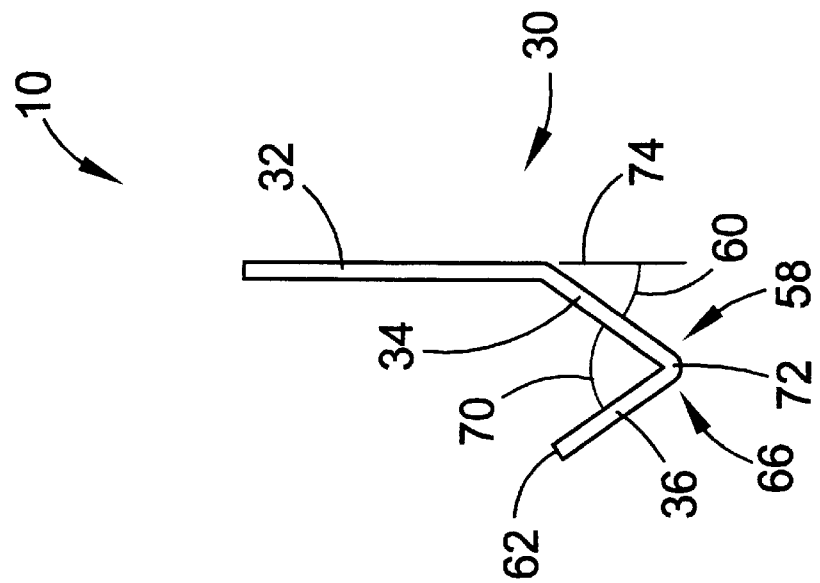
FIG. 3 is side elevation view of the saw caddy shown removed from the workstation.
Figure 2:
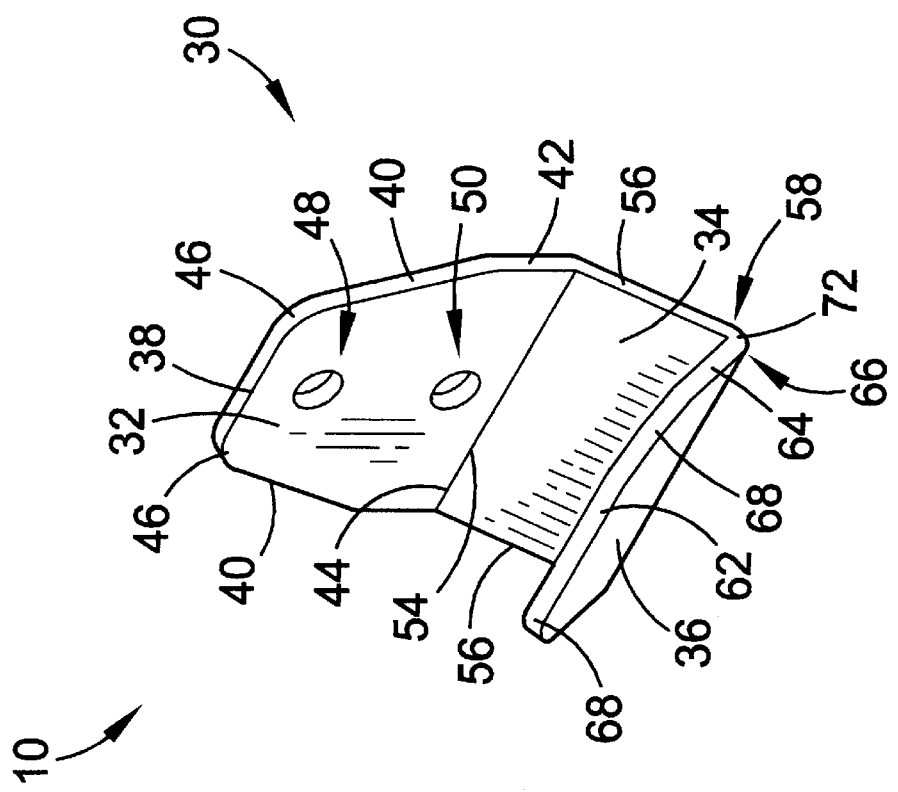
FIG. 2 is a perspective view of the saw caddy shown removed from the workstation.

Referring also to FIGS. 2–3, the saw caddy 10 is preferably constructed from a substantially flat steel unitary member 30 approximately two inches wide, approximately four inches long, and approximately one thirty-seconds of an inch thick. The saw caddy 10 broadly comprises a mounting segment 32 to secure the saw caddy 10 to the workstation leg 18, an offsetting segment 34 to offset the saw 14 from the workstation leg 18, and a retaining segment 36 to retain the saw UBG 24 of the saw 14 on the saw caddy 10.

The mounting segment 32 is preferably approximately one and five eighths of an inch long and comprises a top edge 38, two slanted shoulder edges 40 adjacent either side of the top edge 38, two side edges 42 adjacent the shoulder edges 40, and a bottom edge 44 opposing the top edge 38. The top edge 38 is substantially straight and is approximately one half inch wide and merges into the shoulder edges 40 of the mounting segment 32 at two arcuate corners 46 having an approximately three eighths of an inch radius of curvature to avoid scratching the user, the saw 14, or other objects. The shoulder edges 40 are approximately one and one quarter inches long and meet the side edges 42 of the mounting segment 32 at approximately twenty degrees. The shoulder edges 40 allow the saw caddy 10 to be mounted substantially vertically, while accommodating any slant of the workstation leg 18 without extending above the workstation leg 18 in order to prevent the user, the saw 14, or other objects from being inadvertently caught on the saw caddy 10. The side edges 42 are substantially perpendicular to the top edge 38 of the mounting segment 32 and approximately three eighths of an inch long.

The mounting segment 32 also preferably includes two mounting holes 48,50. The mounting holes 48,50 are approximately three sixteenths of an inch in diameter and designed to accept a fastener, such as a screw, a nail, or a bolt, therethrough in order to secure the saw caddy 10 to the workstation leg 18. A top mounting hole 48 is preferably substantially laterally centered and approximately seven sixteenths of an inch below the top edge 38 of the mounting segment 32. A bottom mounting hole 50 is preferably substantially laterally centered and approximately three sixteenths of an inch above the bottom edge 44 of the mounting segment 32. It can be seen that the mounting holes are substantially vertically aligned. This is due to the workstation leg 18 being substantially vertical, to support the work surface 16, although there may be some slant to the workstation leg 18.

The offsetting segment 34 is preferably approximately seven eights of an inch long and comprises a top edge 54, two side edges 56 adjacent either side of the top edge 54, and a bottom edge 58 opposing the top edge 54. The bottom edge 44 of the mounting segment 32 abuts the top edge 54 of the offsetting segment 34 at a first angle 60 of approximately twenty-five degrees.

The retaining segment 36 is preferably approximately seven eights of an inch long and comprises a top edge 62, two side edges 64 adjacent either side of the top edge 62, and a bottom edge 66 opposing the top edge 62. The top edge 62 merges into the side edges 64 of the retaining segment 36 at two arcuate corners 68 having an approximately one half inch radius of curvature. The bottom edge 58 of the offsetting segment 34 abuts the bottom edge 66 of the retaining segment 36 at a second angle 70 of approximately forty-five degrees. The second angle 70 forms a vertex 72 which is offset approximately one half inch from a plane 74 of the mounting segment 32, due to the first angle 60.

As discussed above, the saw 14 may include the saw table 28 extending beyond the saw UBG 24. Thus, the vertex's 72 offset allows the saw UBG 24 to seat within the vertex 72 while the blade 22 of the saw 14 is held substantially vertical, which is a normal operating orientation for the saw 14 by compensating for the saw table 28. Without the vertex's 72 offset, the saw 14 would need to be tilted in order to seat the saw UBG 24 within the vertex 72, due to the saw table 28 extending beyond the saw UBG 24. Thus, the vertex's 72 offset allows the user to seat the saw 14 upon the saw caddy 10 and retrieve the saw 14 from the saw caddy 10 in the normal orientation and without having to tilt the saw 14.

The first and second angles 60,70 cause the offsetting and retaining segments 34,36 to guide the saw UBG 24 into position within the vertex 72. For example, the user may slide the saw UBG 24 downward along the mounting segment 32. In this case, due to the first angle 60, the offsetting segment 34 guides the saw UBG 24 outward toward the vertex 72. Alternatively, the user may slide the saw UBG 24 downward spaced from the mounting segment 32. In this case, due to the first and second angles 60,70, the retaining segment 36 guides the saw UBG 24 inward toward the vertex 72. The user is thus not required to accurately guide the saw 14 onto the saw caddy 10, since the offsetting and retaining segments 34,36 can properly seat the saw UBG 24 within the vertex 72. Additionally, the arcuate corners 68 of the retaining segment 36 guide the saw 14 into place by laterally centering the saw UBG 24 on the vertex 72.

As a result, the user is not required to look at the saw caddy 10 or the saw 14 while seating the saw 14 upon and retrieving the saw 14 from the saw caddy 10. In fact, the user is only required to have a general knowledge of the saw caddy's 10 location. The saw caddy 10 is preferably colored red or another bright color in order to aid the user in quickly spotting the saw caddy 10.

While the present invention has been described above, it is understood that substitutions may be made. For example, the first and second angles 60,70 have been described such that the retaining segment 36 is aligned at approximately twenty-five degrees with respect to the mounting segment 32. The first and second angles 60,70 may be modified such that the retaining segment 36 is aligned at between zero degrees and ninety degrees with respect to the mounting segment 32. For example, the first angle 60 may be between ten and ninety degrees. The second angle 70 may be between thirty degrees and ninety degrees. However, such extreme angles may limit, or eliminate, the offsetting and retaining segments' 34,36 ability to guide the saw UBG 24 into the vertex 72. Additionally, such extreme angles may limit the retaining member's 36 ability to retain the saw 14 upon the saw caddy 10 without mounting the entire saw caddy 10 at a mounting angle. The first angle 60 may also be modified to adjust the vertex's 72 offset in order to accommodate different saw tables of different saws.

Additionally, the radius of curvature of the arcuate corners 68 of the retaining segment 36 may be between one eighth of an inch and seven inches. In any case, the radius of curvature is preferably less than the saw UBG's 24 radius of curvature, which is approximately eight inches. It should be obvious that if the radius of curvature of the arcuate corners 68 of the retaining segment 36 is greater than or equal to one inch, the retaining segment 36 may not include the top edge 62, as this may be eliminated with larger radii of curvatures.

Furthermore, the saw caddy 10 may be colored orange, yellow, or another bright color that aids the user in spotting the saw caddy with minimal effort. Finally, the unitary member may be made of different materials, such as aluminum, iron, copper, brass, tin, or plastic. These and other minor modifications are within the scope of the present invention.

It should be obvious that the saw caddy 10 may be secured to alternative surfaces of the leg 18. For example, the saw caddy 10 is preferably secured to an outside vertical surface of the leg 18. In this configuration, the saw caddy 10 conveniently holds the saw 14 off the ground and within easy reach of the user. However, the user may find it more beneficial to secure the saw caddy 10 to an inside vertical surface of the leg, as shown in FIG. 1. In this configuration, the workstation 12 substantially surrounds and shields the saw 14, in addition to holding the saw 14 off the ground.

In use, the user secures the saw caddy 10 to the workstation leg 18 of the workstation 12 by driving the fastener through either one or both of the mounting holes 48,50. The user may then place the saw 14 upon the saw caddy 10 and place the workpiece upon the work surface 16 of the workstation 12. The user may then retrieve the saw 14 from the saw caddy 10, cut the workpiece, and then replace the saw 14 upon the saw caddy 10. The user may then reposition the workpiece as needed and repeat this process. It can be seen that the saw caddy 10 conveniently holds the saw 14 within easy reach without requiring the user to bend over, thus avoiding back strain which may lead to back injury.

Having thus described a preferred embodiment of the invention, what is claimed as new and desired to be protected by Letters Patent includes the following:

1. A tool caddy for supporting a tool adjacent a workstation, the tool caddy comprising:
    a substantially flat mounting segment having at least one mounting hole therethrough, wherein the hole is operable to accept a fastener in order to secure the tool caddy to the workstation;
    a substantially flat offsetting segment extending downwardly from and arranged at a first angle with respect to a plane of mounting segment;
    a substantially flat retaining segment arranged at a second angle with respect to the offsetting segment.

2. The tool caddy as set forth in claim 1, wherein the retaining segment is aligned at between zero degrees and ninety degrees with respect to the mounting segment wherein the retaining segment is entirely spaced from the mounting segment.

3. The tool caddy as set forth in claim 1, wherein the first angle is between ten and eighty degrees.

4. The tool caddy as set forth in claim 1, wherein the second angle is between thirty and ninety degrees.

5. The tool caddy as set forth in claim 1, wherein the first angle is approximately twenty-five degrees and the second angle is approximately forty-five degrees.

6. The tool caddy as set forth in claim 1, wherein the offsetting segment abuts the retaining segment at a vertex spaced approximately one half inch from a plane of the mounting segment in order to align the tool in a normal operating orientation.

7. The tool caddy as set forth in claim 1, wherein the segments are constructed from a unitary member.

8. The tool caddy as set forth in claim 7, wherein the unitary member is composed of a material selected from the group consisting of aluminum, steel, iron, copper, brass, tin, and plastic.

9. The tool caddy as set forth in claim 7, wherein the unitary member is approximately two inches wide.

10. The tool caddy as set forth in claim 7, wherein the unitary member is approximately four inches long.

11. A tool caddy for supporting a tool adjacent a leg of a workstation, wherein the tool includes an arcuate concave member, the tool caddy comprising:
    a substantially flat mounting segment having at least one mounting hole therethrough, wherein the hole is operable to accept a fastener in order to secure the tool caddy to the leg;
    a substantially flat offsetting segment extending downwardly from and arranged at a first angle of with respect to a plane of the mounting segment;
    a substantially flat retaining segment having rounded corners operable to support the tool by mating with the arcuate concave member, wherein the retaining segment is arranged at a second angle with respect to the offsetting segment; and
    wherein the retaining segment is aligned at between zero degrees and ninety degrees with respect to the mounting segment.

12. The tool caddy as set forth in claim 11, wherein the retaining segment is aligned at between twenty degrees and sixty degrees with respect to the mounting segment.

13. The tool caddy as set forth in claim 11, wherein the first angle is between ten degrees and forty degrees.

14. The tool caddy as set forth in claim 11, wherein the second angle is between thirty degrees and sixty degrees.

15. The tool caddy as set forth in claim 11, wherein the first angle is approximately twenty-five degrees and the second angle is approximately forty-five degrees.

16. The tool caddy as set forth in claim 11, wherein the offsetting segment meets the retaining segment at a vertex spaced approximately one half inch from a plane of the mounting segment in order to align the tool in a normal operating orientation.

17. The tool caddy as set forth in claim 11, wherein the tool caddy is constructed from a unitary member.

18. The tool caddy as set forth in claim 17, wherein the unitary member is composed of a material selected from the group consisting of aluminum, steel, iron, copper, brass, tin, and plastic.

19. The tool caddy as set forth in claim 17, wherein the unitary member is approximately two inches wide, approximately four inches long, and brightly colored.

20. A carpentry workstation operable to support a workpiece and a circular saw in close proximity to and below the workpiece, the workstation comprising:
    a workpiece support comprising
        work surface operable to support the workpiece, and four legs operable to support the work surface at between thirty inches and fifty inches high;

a saw caddy constructed from a brightly colored unitary member approximately two inches wide, approximately four inches long, and composed of a material selected from the group consisting of aluminum, steel, iron, copper, brass, tin, and plastic, the saw caddy being secured to one of the legs between six inches and twelve inches below the work surface and comprising substantially flat mounting segment having a plurality of mounting holes therethrough, wherein the holes are substantially vertically aligned and operable to accept a fastener in order to secure the saw caddy to the leg, a substantially flat offsetting segment meeting extending downwardly from the mounting segment at an approximately twenty-five degree angle and approximately one half inch from the leg, and a substantially flat retaining segment operable to mate with an arcuate concave blade guard of the saw thereby supporting the saw, wherein the retaining segment is arranged at an approximately forty-five degree angle to the offsetting segment.

\* \* \* \* \*